C. J. & P. MAY & G. D. SHANNON.
DRAG SAW.
APPLICATION FILED AUG. 25, 1909.
964,669.
Patented July 19, 1910.
2 SHEETS—SHEET 1.
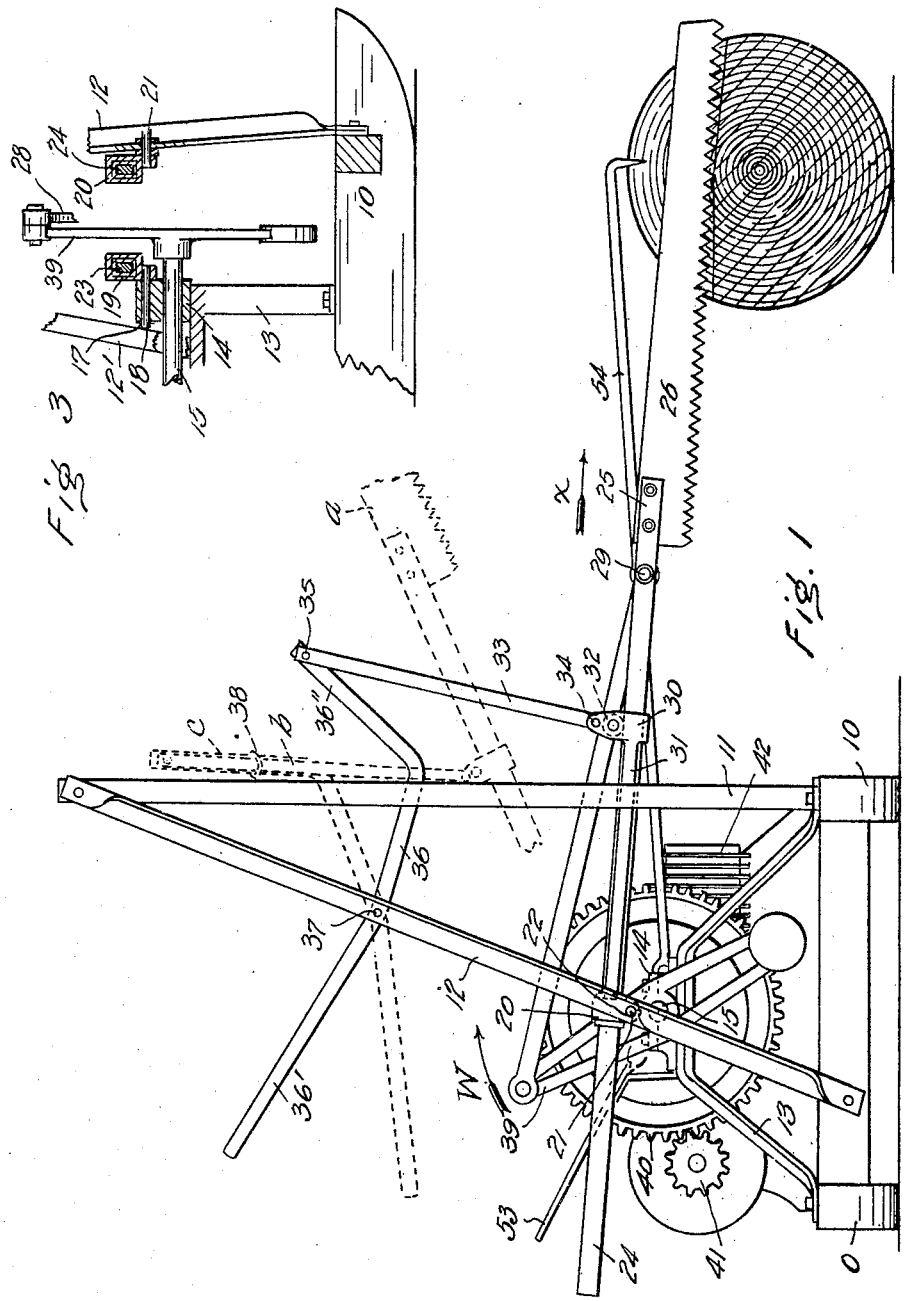
WITNESSES:
H. Barnes
W. C. Pugh
INVENTORS:
Caleb J. May
Perry May and
George D. Shannon
by Pierre Barnes
ATTORNEY C. J. & P. MAY & G. D. SHANNON.
DRAG SAW.
APPLICATION FILED AUG. 25, 1909.
964,669.
Patented July 19, 1910.
2 SHEETS—SHEET 2.
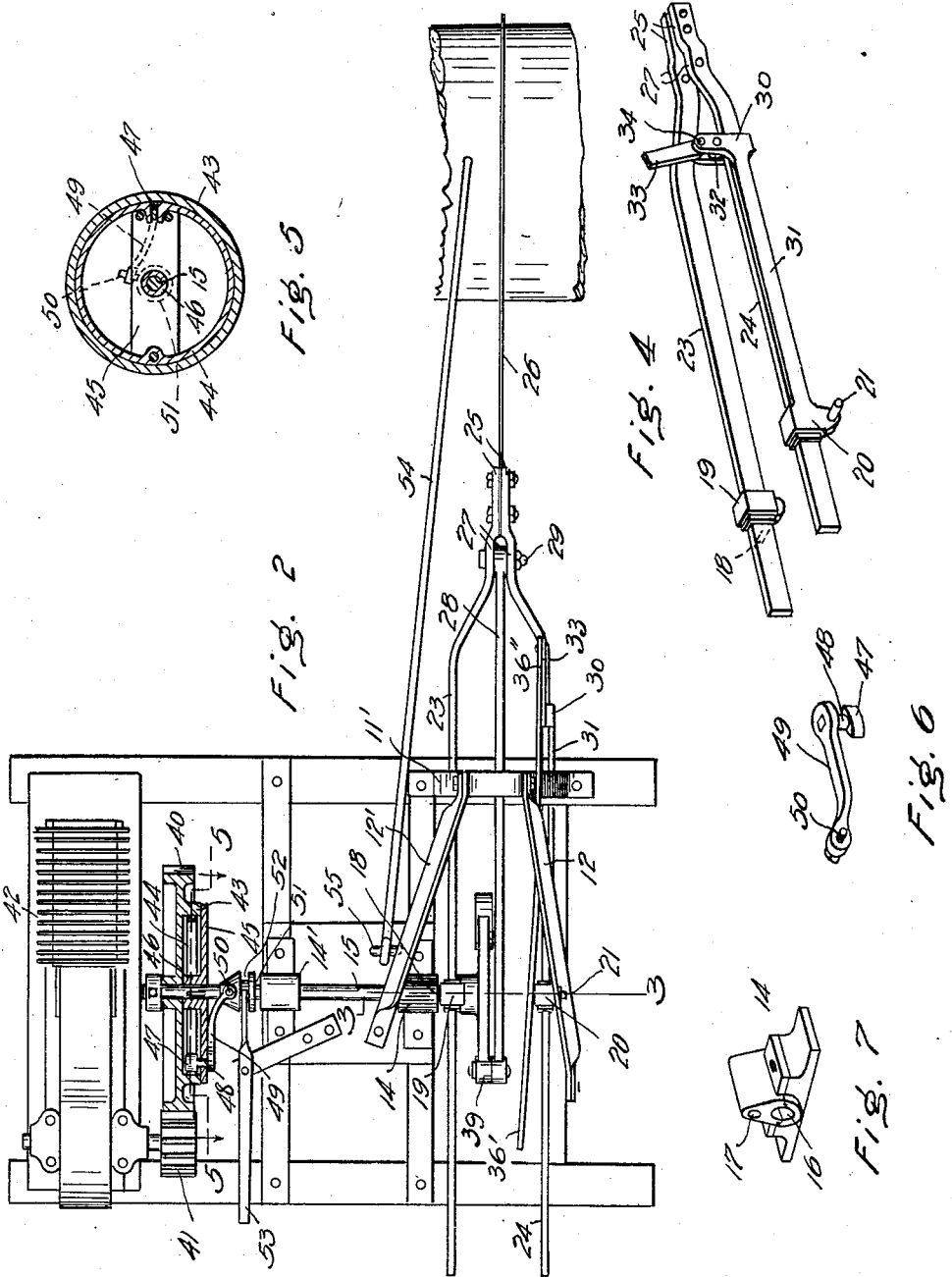
WITNESSES:
H. Barnes.
M. Pugh.
INVENTORS:
Caleb J. May
Perry May and
George D. Shannon
by Pierre Barnes
ATTORNEY

UNITED STATES PATENT OFFICE.

CALEB J. MAY, PERRY MAY, AND GEORGE D. SHANNON, OF ANACORTES, WASHINGTON.

DRAG-SAW.

964,669.  Specification of Letters Patent.  Patented July 19, 1910.

Application filed August 25, 1909. Serial No. 514,546.

*To all whom it may concern:*

Be it known that we, CALEB J. MAY, PERRY MAY, and GEORGE D. SHANNON, citizens of the United States, residing at Anacortes, in the county of Skagit and State of Washington, have invented certain new and useful Improvements in Drag-Saws, of which the following is a specification.

This invention relates to sawing machines of that class known as "drag-saws" and which are employed in cutting logs into short lengths for shingle-bolts, firewood, etc.

The object of the invention is the improvement of machines of this nature so that the efficiency thereof is increased.

The invention consists in the novel construction, adaptation and combination of parts, as will be hereinafter described and claimed.

In the accompanying drawings, Figure 1 is a side elevation of a portable drag-saw embodying our invention. Fig. 2 is a plan view of the same with parts thereof in horizontal section. Fig. 3 is a sectional view taken substantially through 3—3 of Fig. 2. Fig. 4 is a perspective view of the saw-frame and certain associated parts. Fig. 5 is a cross sectional view taken through 5—5 of Fig. 2. Fig. 6 is a detached perspective view of the clutch operating lever. Fig. 7 is a perspective view of a journal box employed in the illustrated machine.

The reference numeral 10 designates the runners of a sled which furnishes a portable support for the sawing machine proper. Secured to the support is a standard comprised of upwardly extending front and rear members 11, 11' and 12, 12' which are suitably connected at the top to afford a rigid structure. To one side of the standard is a support 13 whereupon are secured journal-boxes 14 and 14' for a transversely arranged rotary shaft 15. Above the journal-bearing 16 for said shaft the box 14 is provided with a socket 17 for the reception of a stud 18 extending from a hollow block 19. A companion block 20 is pivotally supported by its stud 21 by having the latter extend through an aperture 22 in the outer of the frame members 12. The axes of the socket 17 and the aperture 22 are in alinement. 23 and 24 are bars which constitute the saw frame and are formed of relatively small sizes so as to yieldingly bend to transverse strains. The rear portions of these bars are slidably seated in the respective blocks 19 and 20. The front portions of the bars are formed to provide at their extremities jaws 25 between which the saw 26 is clamped by securing bolts 26'. Adjacent to these jaws said bars are offset, as at 27, to afford a housing for the forward end of a pitman 28 and which is attached thereto by a pin 29.

To furnish an outer bearing and guide for the saw-frame is a block 30 through which extends the frame-bar 24 and, as best shown in Fig. 4, is rigidly connected with the block 20 by a bar 31. The block 30 also accommodates an anti-friction roller 32 positioned to have its periphery contact with the top edge of the bar. 33 is a link which is connected by a pin 34 with the block 30 and by a pin 35 with the end of a lever 36 which is fulcrumed at 37 to the frame-member 12 so that the handle end 36' is within convenient reach of the operator when standing to the rear of the machine. This lever is characterized by having the arm to which the link is connected bent upwardly, as at 36'', so that when the lever is manipulated to raise the saw into position in which it is indicated by broken lines *a* in Fig. 1, the link will be in position *b* which will coincide in direction with the lever arm, then at *c*, to allow a ring 38 being placed about the link and the arm to retain the same in condition to have the saw elevated as, for example, when the machine is to be moved from one place to another.

The rear end of pitman 28 is connected to the pin of a counterweighted crank 39 which is fixedly secured to the aforesaid shaft 15. Loosely mounted upon the shaft is a gear-wheel 40 which is driven from a pinion 41 upon the power shaft of a motor 42. To transmit rotary motion from the wheel 40 to shaft 15 we employ clutch devices of a suitable type and preferably such as illustrated in the drawings. More particularly, there is provided integrally with the wheel a ring 43 having its inner periphery machined to coact with a ring 44 which is connected to a bar 45 provided with a centrally disposed hub 46 which is fixedly mounted upon the shaft 15. The ring 44 is divided upon one side and intermediate the parts thereof is the flattened head 47 of a bolt 48 which passes through an opening in the bar 45. The outer end of the bolt is secured to the end of an arm 49 having at its other end an adjustable screw 50 which is engageable by the conical portion of an element 51 mounted upon the shaft 15. Said element is provided with a circumferential groove 52 for coupling with a lever 53 by which the element may be shifted to cause the conical portion of the latter affecting the arm 49 to cause it to be swung upon the bolt 48 whereby the head 47 of the same will press asunder the ends of the ring 44; whereupon this ring will frictionally engage the ring 43 for making a driving connection between the rotating gear-wheel and the shaft 15 which effects the operative movements of the saw. 54 is a rod which is secured to a suitable part of the machine frame, as an eye-bolt 55 upon the frame part 13 and has at its opposite end a dogging hook for driving into the log being sawed to temporarily tie the same with the machine.

In operation, the shaft 15 is rotated in the direction indicated by arrow W in Fig. 1 and the saw frame 23, 24 is guided by blocks 19, 20 and 30 to travel in a plane above the shaft 15 from which the reciprocating movements of the saw are derived. Under such conditions the saw will be caused to move in a downward direction in the latter part of each of its strokes and especially upon the return strokes, when the pull exerted through the pitman from the relatively low points in the travel of the crank-pin acts to bend the saw-frame downwardly with a depressing of the inner end of the saw. While upon the outward strokes, corresponding with the arrow x, the bending of the frame is minimized through the elevation of the plane of the saw's travel being such that the thrust of the pitman will be exerted in the direction having but a slight angular variation from the longitudinal axis of the saw frame. These conditions contribute to the efficiency of the machine as the saw-kerf is cleared of dust, or nearly so, at the termination of each stroke of the saw thereby permitting of employing lighter construction for the various parts of the machine and also requiring less set of the saw-teeth with correspondingly less duty to be performed thereby.

Having described our invention, what we claim as new and desire to secure by Letters-Patent, is—

1. A portable drag-saw machine comprising a portable base, a standard mounted upon the base and formed of front and rear members connected together at their top, a support mounted upon the base at one side of the standard, journal bearings upon said support, a shaft mounted in said bearings and projecting from each side of said support, means engaging with one end of said shaft for operating it, a guide block supported by one of said bearings, a guide block supported by one of said members, a saw frame comprising parallel bars traveling in said guide blocks, a saw connected to the frame, a pitman secured to the forward end of the frame, a counter-weighted crank attached to said shaft and having one end connected to said pitman and means mounted on the standard for raising and lowering the saw.

2. A portable drag-saw machine comprising a portable base, a standard fixed thereto, a shaft, journal bearings for said shaft supported upon the base, means engaged to one end of the base for rotating the shaft, a guide block supported by one of said bearings and a guide block supported by said standard, a saw frame comprising parallel bars extending through said guide blocks, a saw fixed to the frame, a counter-balanced crank fixed intermediate its ends to said shaft, a pitman connected at one end to one end of said crank and having its other end attached to the forward end of the saw frame and means mounted upon the standard for raising and lowering the saw.

3. A portable drag-saw machine comprising a base, a shaft, a standard mounted on said base, journal bearings for said shaft supported by the base, a guide block connected to one of said journal bearings and arranged in a plane above the shaft, a guide block supported by said standard and arranged in a plane above the shaft, a saw frame comprising parallel bars extending through said guide block, a saw fixed to the frame, operative connection between the shaft and said frame for driving the saw and means mounted on the standard for elevating and lowering the saw.

4. A portable drag-saw machine comprising a base, an operating shaft, bearings therefor, a guide block supported by one of said bearings and in a plane above said shaft, another guide block in a plane above said shaft, means for supporting the last mentioned guide block, a saw frame comprising parallel bars extending through said guide blocks, a combined coupling and guide block mounted upon one of the sections of the saw frame and connected to one of the other guide blocks, a link attached to said combined coupling and guide block, a lever having an angular end pivoted to said link, a saw secured to the frame, and operative connection between the shaft and the frame for driving the saw.

5. A drag-saw machine comprising a saw frame, guides therefor, a saw secured thereto, a combined coupling and guide block surrounding a portion of the frame and connected to one of said guides, a link pivoted to said combined coupler and guide block, and a pivoted lever having an angular end pivoted to said link, the angularity of said end being such that when the lever is shifted in one direction to elevate the saw, said end will extend in parallelism with said link whereby they can be coupled in such position to maintain the saw elevated.

6. A drag-saw machine comprising a pivoted saw frame, a link pivotally-connected thereto, and a pivoted lever having an angular end articulated to said link, the angularity of said end being such that when the lever is shifted in one direction the frame will be elevated and the link will extend in parallelism with respect to said end whereby the link and end can be coupled together while parallel to maintain the saw frame in an elevated position.

7. A drag-saw machine comprising a pair of pivoted guide blocks, an operating shaft arranged below the plane of said blocks, a saw frame comprising parallel bars extending through the guide blocks, a saw fixed to said frame, a counter-weighted crank connected intermediate its ends to said shaft, and a pitman having one end connected to one end of said crank and its other end attached to the forward end of the frame and constituting an operative connection between the crank and the saw for driving the latter.

CALEB J. MAY.
PERRY MAY.
GEORGE D. SHANNON.

Witnesses:
  LOUIS SEMAR,
  W. H. BEARD.